Patented June 17, 1952

2,600,620

UNITED STATES PATENT OFFICE 2,600,620

PROCESS OF MAKING COLORLESS AMINO-2-THIAZOLE

Marc Jean Lazare Crauland, Paris, France, assignor to Societe Anonyme des Manufactures des Glaces et Produits Chimiques de Saint-Gobain, Chauny & Cirey, Paris, France No Drawing. Application December 22, 1949, Serial No. 134,613. In France January 4, 1949

6 Claims. (Cl. 260—306.8)

This invention relates to the preparation of colorless amino-2-thiazole

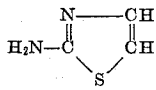

Amino-2-thiazole has been made before, but always, so far as is known, as a colored compound. The invention also relates to the purification of amino-2-thiazole by new, simple, and superior methods.

One method of making amino-2-thiazole has been to condense thiourea with chloracetal or some other compound equally capable of yielding chloracetaldehyde in the nascent state, but those processes have always been hard to use because they produce dilute solutions of amino-2-thiazole which must be extracted with organic solvents. It is an object of this invention to overcome these imperfections of the said process.

In carrying out the process the main reaction is between monochloracetaldehyde or its hydrate, on one hand, and thiourea on the other. The thiourea can be added to a solution of monochloracetaldehyde, or crystallized monochloracetaldehyde hydrate can be added to thiourea solution. The reaction is self-starting and strongly exothermic, and its temperature may, and preferably should, be controlled by the rate of addition of the added reactant, or by cooling the reaction mass, or both.

The product of this primary reaction is amino-2-thiazole chlorhydrate, and the desired end product is liberated from it by neutralization with the exactly theoretical amount of aqueous solution of an alkali. The concentration of this alkaline solution should be such as to avoid excessive dilution, which causes losses, but the use of too concentrated an alkali solution adds color to the product unless the temperature of the reaction is rigidly controlled. In practice, NaOH aqueous solutions in the range 30–48° Bé. are satisfactory, the less concentrated solutions in this range being employed on the more highly concentrated solutions of thiourea and vice versa. The final water content of the mass should keep the sodium chloride that is formed in the reaction in solution as the amino-2-thiazole precipitates.

The raw amino-2-thiazole thus produced by the advantageous steps already recited can be purified by washing it with sodium chloride or with an acetone-benzene mixture, but it may happen that the product is colored, as is apt to occur if the alkali employed was too concentrated, or to arise from unknown causes after standing for sometime in the air. To avoid this coloration a special purification process has been conceived and reduced to practice and forms an important part of the invention. The essence of this purification is to wash the raw amino-2-thiazole with ammonia solution, but in practice it is advisable to employ an ammonia sodium chloride solution rich in salt, for one reason because this reduces the entrainment of the thiazole in the wash water. The purification is carried out on a filter by making a paste of the thiazole, and the salt and ammonia solution, drying it, and then washing repeatedly with fresh ammonia solution and drying, repeatedly until the product remains colorless, or in some cases where a colorless product is not required, until a very clear, light yellow color is obtained.

It is advantageous to add some ammonia to the reaction mass at the time the amino-2-thiazole is freed from its hydrochloride by precipitation with the caustic soda or other alkalis.

The following examples illustrate the invention:

Example 1

A solution of monochloracetaldehyde is prepared by adding 50 cc. of water to 87.5 grams of monochloracetaldehyde semi-hydrate. This solution is mechanically agitated and 1 mole of thiourea is added in 4 parts, an interval of 15 to 30 minutes between additions, the mass being allowed to cool near 30° C. before the introduction of the next portion. After the last part has been added the mass is agitated for about two hours and allowed to attain ambient temperature. Under these conditions, the maximum temperature reached in the course of the operations is 57° C. After the reaction has been completed the vessel is chilled in an ice bath and a mole of caustic soda in a 36° Bé. solution is added, 17 minutes being required for the addition, the cooling with ice being maintained throughout the addition. Amino-2-thiazole precipitates and is dried by evaporation, is washed twice with a little of the saturated sodium chloride and dried under vacuum. The yield is 91% of theoretical.

This process is particularly advantageous because it avoids the prolonged heating which was necessary in prior processes and avoids the extraction of amino-2-thiazole by means of an organic solvent.

Example 2

Amino-2-thiazole hydrochloride is prepared as in Example 1. After the end of that reaction the mass is chilled in an ice bath and there is added 15 cc. of concentrated ammonia of 22° Bé., then 195 cc. of sodium hydroxide solution of 35° Bé. liberates the amino-2-thiazole. The mass is dried rapidly. The product is made into a paste with a solution containing 70 grams of sodium chloride, 50 cc. of 22° Bé. ammonia and 300 grams of water. The mass is dried and then the product is washed several times with the said solution, about 120 cc. being used in the washing. The product obtained is colorless, remains colorless upon exposure to the air, has a fusion point of 90° C. and appears in a yield of 76.5%.

The invention contemplates the preparation of amino-2-thiazole by reacting thiourea with monochloracetaldehyde, mole for mole in the presence of a quantity of water comprising between 40 grams and 135 grams per mole of thiourea and preferably between 50 and 75 grams; the addition of a concentrated caustic solution to liberate the amino-2-thiazole from its hydrochloride; the regulation of the concentration of the alkaline solution so that the final water content will be sufficient to prevent the precipitation of the alkali chloride with the thiazole; the washing of the product with a saturated solution of alkali chloride; the use of ammonia solution, and of ammonia salt solution to purify the product; the addition of ammonia to the solution prior to or during the precipitation by caustic alkali solution.

As many apparently widely different embodiments of the present invention may be made without departing from the spirit and scope thereon, it is to be understood that the invention is not limited to the specific embodiments.

What is claimed is:

1. The method of making amino-2-thiazole that comprises adding to 137.5 grams of a solution of monochloracetaldehyde containing 87.5 of the semi-hydrate of monochloracetaldehyde, wtih agitation, adding 1 mol of thiourea in 4 parts at intervals of 15-30 minutes, and continuing the agitation for about two hours after the final addition, cooling with external ice, adding to the solution 15 cc. of 22° Bé. aqueous ammonia solution, adding 195 cc. of 35° Bé. aqueous NaOH, drying rapidly, pasting the product with 70 grams NaCl, 50 cc. of 22° Bé. NH4OH, and 300 grams H2O, drying, and washing, and drying, repeatedly with aqueous ammonia solution.

2. The method of making amino-2-thiazole that comprises reacting monochloracetaldehyde and thiourea by gradually adding one to a solution of the other with agitation, cooling the reaction mass, adding alkali solution of concentration equivalent in effect to 30-48° Bé. NaOH in quantity sufficient to precipitate the amino-2-thiazole, drying, pasting with concentrated ammoniacal salt solution, and washing, and drying, repeatedly with salt and ammonia solution until the product is colorless.

3. The method of making amino-2-thiazole that includes the steps of reacting non-halogenated acetaldehyde and thiourea in aqueous solution, in molar quantities, adding a molar quantity of caustic alkali solution of 30-48° Bé. concentration, drying the product, and washing it with concentrated ammoniacal salt solution.

4. The method of making amino-2-thiazole that comprises reacting thiourea with monochloracetaldehyde, reacting the product with caustic solution, equivalent to 30-48° Bé. NaOH, and washing the product with concentrated ammonia.

5. The method of making amino-2-thiazole that comprises reacting thiourea with monochloracetaldehyde mole for mole in the presence of 50 to 75 grams of water per mole of thiourea, and precipitating the amino-2-thiazole by neutralization with an equivalent amount of ammoniacal caustic soda solution of concentration in the range 30-48° Bé., and washing the precipitate with an ammonia-sodium chloride solution rich in salt.

6. The method of making amino-2-thiazole that comprises reacting thiourea with monochloracetaldehyde mole for mole in the presence of 40 to 135 grams of water per mole of thiourea, and precipitating the amino-2-thiazole by neutralization of the reaction mass by alkali in the presence of ammonia.

MARC JEAN LAZARE CRAULAND.

REFERENCES CITED

The following references are of record in the file of this patent:

UNITED STATES PATENTS

| Number | Name | Date |
|---|---|---|
| 2,330,223 | Kyrides | Sept. 28, 1943 |
| 2,517,276 | Bassford et al. | Aug. 1, 1950 |

OTHER REFERENCES

Traumann: Liebig's Annalen, vol. 249 (1888), pp. 31-37.